(12) United States Patent
Allen et al.

(10) Patent No.: US 9,111,181 B2
(45) Date of Patent: Aug. 18, 2015

(54) DETECTING AND FLAGGING LIKELY CONFIDENTIAL CONTENT IN PHOTOGRAPHS TO PREVENT AUTOMATED DISSEMINATION

(71) Applicant: International Business Machines Corporation, Armonk, NY (US)

(72) Inventors: Corville O. Allen, Durham, NC (US); Scott R. Carrier, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/101,970

(22) Filed: Dec. 10, 2013

(65) Prior Publication Data
US 2015/0161483 A1  Jun. 11, 2015

(51) Int. Cl.
| | |
|---|---|
| G06K 9/00 | (2006.01) |
| G06K 9/62 | (2006.01) |
| H04N 5/225 | (2006.01) |
| G06F 7/04 | (2006.01) |

(52) U.S. Cl.
CPC .......... *G06K 9/6267* (2013.01); *G06K 9/00288* (2013.01)

(58) Field of Classification Search
CPC ............ H04N 5/00; H04N 21/00; G06K 9/00
USPC .......... 382/103, 115–118, 236; 348/169–172, 348/352; 726/26
See application file for complete search history.

(56) References Cited

U.S. PATENT DOCUMENTS

| | | | |
|---|---|---|---|
| 8,091,138 B2 * | 1/2012 | Yellepeddy et al. ............ | 726/26 |
| 8,127,365 B1 | 2/2012 | Liu et al. | |
| 8,218,015 B2 * | 7/2012 | Wun ........................ | 348/207.99 |
| 8,255,370 B1 * | 8/2012 | Zoppas et al. ................ | 707/694 |
| 2005/0066165 A1 | 3/2005 | Peled et al. | |
| 2008/0055408 A1 | 3/2008 | Wun | |
| 2008/0262841 A1 | 10/2008 | Miyamoto et al. | |

* cited by examiner

*Primary Examiner* — Abolfazl Tabatabai
(74) *Attorney, Agent, or Firm* — Robert H. Frantz; Jeffrey S. LaBaw

(57) ABSTRACT

Automatic distribution of image data, such as a digital photographs, is prevented or delayed if the photograph is determined to likely contain confidential data. Online photo streaming services, albums, social media accounts, and backup services can be a source of inadvertent disclosure of confidential information due to these automatic dissemination functions of modern photo capturing devices. Detection criteria to trigger the blocking of dissemination may include recognition of faces of co-workers and clients, recognition of business furnishings such as whiteboards and conference room equipment, as well as geotags where the image was captured, the time, day of week, and date at which it was captured, and network identifiers associated with the network on which the capturing device is connected.

19 Claims, 4 Drawing Sheets

DETECTING AND FLAGGING LIKELY CONFIDENTIAL CONTENT IN PHOTOGRAPHS TO PREVENT AUTOMATED DISSEMINATION

FIELD OF THE INVENTION

This invention relates generally to methods, systems, computer program products and automated processes for detecting potentially confidential information in photographs and for preventing automated dissemination, such as uploading or cloud storing, of the photograph.

BACKGROUND OF INVENTION

Mobile devices are becoming increasingly integrated with "cloud". That is, emails, photographs, and other documents stored on the mobile device are often uploaded to a centralized external server which synchronizes the digital documents with the user's other devices.

One such example is an online photograph album service, which, responsive to a user taking a picture on their phone or tablet computer, the digital photograph is automatically uploaded to the album service's online storage, where it may then be available to the user's other connected devices, and potentially to other users such as "friends" or "subscribers" or "followers" of the user as in social media and other paradigms.

Occasionally, a user may unknowingly take and share a digital photograph which contains information he or she does not wish to be made public. For example, a group of co-workers may hold a baby shower in a conference room in an office environment during a work day, at which a number of employees are present and many casual and composed photographs may be taken. As the users of these capturing devices, such as phones and tablet computers, upload their photos to their online albums, social media accounts, etc., the photographs become publicly accessible to one degree or another. However, it may later be discovered that in the background of some of these photographs appears a whiteboard on which confidential company information appears. While this is unfortunate, there is very little that can be done to "put the toothpaste back in the tube" because deleting the photo from one's online accounts and albums may not actually retrieve and delete all copies which have been distributed to trusted associates (followers, friends, etc.) of those online accounts.

SUMMARY OF THE INVENTION

Embodiments of the invention automatically prevent automatic distribution of image data, such as a digital photograph, containing confidential data from being distributed to a remote location, such as a cloud storage or online photographic album, by marking a first image data as having a likelihood score of containing confidential information based on one or more content detection criteria, and preventing automatic remote transmission or distribution of the first image data according to the score. Detection criteria in some embodiments may include some or all of where the image was captured, the time, day of week, and date at which it was captured, network identifiers associated with the capturing device, ownership information regarding the capturing device, automatic text recognition results from analysis of the content of the digital image, manual transcription of the content of the digital image, automatic object recognition results from analysis of the content of the digital image, user-provided identification of the content of the digital image, and facial recognition of persons appearing in the digital image.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Figure 1:
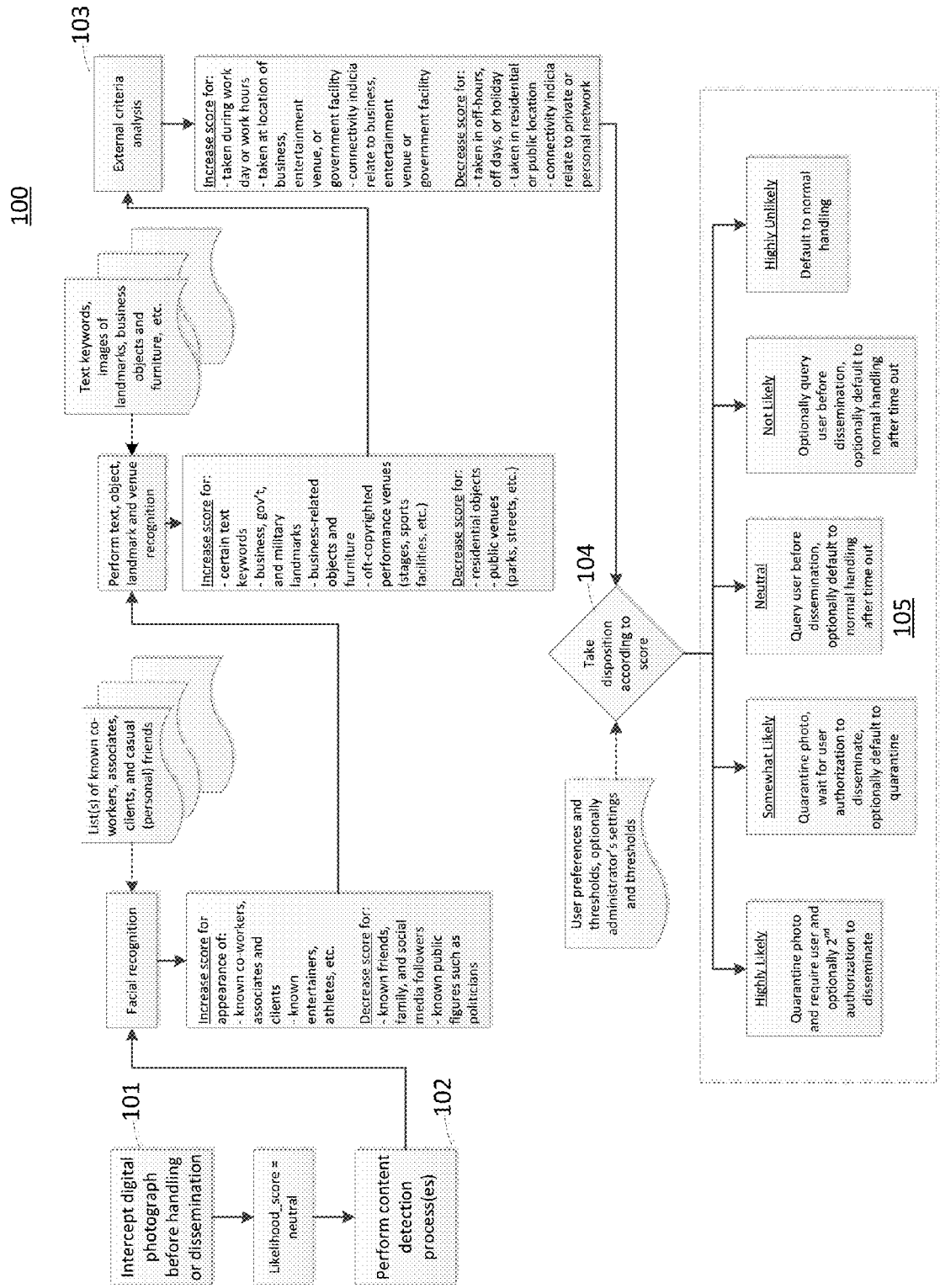
FIG. 1 illustrates a first example logical process according to the present invention.

Having recognized the foregoing problem in the art, the inventors initially set out to find an existing technology which may address this issue. Published U.S. patent application 2008/0055408 A1 by Archer Wun entitled "Method for Monitoring and Controlling Photographs Taken in a Proprietary Area" appears to disable local storage of a capturing device's photographs before photograph can be analyzed by a restrictor's servers. It requires high degree of control of the capturing device, which can be unrealistic for many users of personal mobile devices, especially for pre-existing devices which do not incorporate the send-then-delete functionality required for the restrictor's servers to attain exclusive control of the original copy of the digital image.

Published U.S. patent application 2008/026841 A1 by Kohtaro Miyamoto, et al, entitled "Method and Apparatus for Graphically Portraying Gaming Environment and Information Regarding Components Thereof", purports to be able to scrub audio and video data, detecting confidential information, identify sensitive information, whereby it obscures the information rendering it "harmless" for dissemination. While this has certain utility, the obscuring methods and processes may be algorithmic, and may be susceptible to reverse processes which would reveal the confidential information.

Having found no existing technologies which addressed the inventors' unique perspective of the problem, the inventors set about developing the process, system, and computer program product as set forth in the following paragraphs.

Overview

Disclosed is a method of detecting or inferring the likelihood of the presence of confidential information in a digital (or digitized) photograph, and according to the likelihood, restricting distribution via electronic means such as uploading to an album, posting on a social media account, etc.

Factors such as photograph content (objects, faces, landmarks, etc.), geolocation, employee/user work schedule, ownership of the capturing device, and network connection attributes may be considered in determining likelihood of confidential content.

Example User Experience

Whereas the vast majority of digital photographs which fall within the problem domain are digital photographs captured by individual users using their private or personal mobile devices (phones, tablet computers, etc.), the inventors sought to develop a system and method which centered on a user experience for relatively ordinary users (e.g. without requiring a high degree of skill with the device's security controls, operating system, etc.).

Such a user experience might unfold as follows: A user takes a picture with a cellular camera phone. Based in the image contents, location, time-of-day, day of the week, and other potential criteria surrounding the capture of the image, the image may be flagged by an embodiment of the invention as "confidential" or "public", optionally with a degree of confidence in the determination (e.g. "probably confidential", "possibly confidential", etc.). Based on this flag, the image may be "locked down" by the embodiment of the invention by restricting digital distribution such as to a cloud-based photo streaming service, attachment to email or multi-media messaging service, uploading or posting on a social media "page" or account, etc. Using an embodiment of the present invention, digital pictures taken at work, for example, of confidential information are not automatically shared with the device's cloud-based photo stream service, securing the information from unintended recipients. Similarly, digital pictures that taken at a venue such as live entertainment or sports even where photographs are restricted (e.g. copyright is asserted by the performers or sports league), may also be automatically tagged as likely containing confidential information, thereby assisting the user in complying with copyrights.

First Logical Process Embodiment

At least one embodiment of the present invention includes a programmed computer system in which the processor under control of instructions stored in computer-readable, tangible memory devices, performs certain accessing of data, logical and calculation operations on that data, and outputting of certain results of the operations.

Turning to FIG. 1, a first logical process exemplary embodiment of the present invention is illustrated as process suitable for performance by a computer system having processor or by electronic hardware circuits such as customized integrated circuit devices:

101. The user takes a digital photograph with a connected mobile device, wherein the mobile device is already cloud-enabled for instant distribution of local documents (photographs, emails, and other documents) or otherwise enabled for automatic uploading or dissemination of digital photographs.

102. The digital photograph's content may be accessed and analyzed according to one or more detection processes to detect content which may represent of confidential information, such as but not limited to:
   a. Photograph subject matter may imply confidential nature. If it's a picture of scenery or people, it may be less likely to be confidential (people are friends of the user according to social media lists), or it may be more likely confidential (people are co-workers or clients). On the other hand, pictures of whiteboards, laboratories, manufacturing facilities, presentations, training sessions often document work-based activities, or performances subject to copyright may therefore be more likely to be confidential by implication.
   b. Using screen scrape technologies, hand-written text may be transcribed to ASCII characters for analysis. Machine-readable content, such as text, objects (whiteboards, stages, sports fields, presentation rooms, landmarks, government buildings, etc.), and faces, may be subjected to one or more recognition processes to identify their presence in the digital photograph.
   c. Presence of keywords may more explicitly and more strongly suggest confidentiality, such as but not limited to "confidential", "preliminary", "eyes only", "restricted", "draft", "copyright", "secure", etc.
   d. Presence of company names, project names, logos and trademarks may imply confidential nature, such as "IBM" or "Project X".

103. Extrinsic criteria associated with the digital photograph besides content of the photograph may also be considered in the analysis.
   a. Geolocation attributes in EXIF data may be analyzed to determine location of photograph. If the digital picture was taken at a geolocation within the geographic boundaries known to be a company premises, government installation, or military facility, the content of the digital photograph may default to "confidential" or otherwise be flagged as highly likely to be confidential or sensitive.
   b. Time of day, day of week, and calendar day (e.g. holiday, weekend, work day) on which the digital photograph was captured may be used to increase or decrease the likelihood score of confidential content, and for further precision, these time of capture criteria may be correlated with capturing device owner's calendar or schedule to determine if work-based activities are likely at the time of capture. The scoring process may use conventional "work hours", such as 8:00 AM-6:00 PM on Monday-Friday (or Sunday through Thursday in some cultures) to suggest work-based activities may be captured in the digital photograph.
   c. The process may associate the time of capture to a device owner's calendar for detailed understanding of owner's work and personal calendar to increase the accuracy of this part of the scoring process.
   d. Network connectivity identifiers and attributes, such as wireless network attributes, Internet Protocol (IP) address, IP port, Virtual Private Network (VPN) and encryption status may be further considered by the process to infer greater or lesser likelihood of confidential content in the digital photograph. Communications network name, such as a Service Set Identifier (SSID), may be considered by the process to increase the likelihood score if it is known to be a corporate, government, or military-associated network, or to decrease the likelihood score otherwise. Other network attributes may be communicated to the device to suggest confidential location and activities, such as enterprise connection encryption.

104. Following completion of the scoring of the likelihood confidential or sensitive content in the digital photograph, one of the following categorical dispositions (105) may be taken by embodiments according to the present invention:
   a. Very low likelihood of any confidential content. Handle (upload, transmit, synchronize, etc.) the digital photograph normally without interception, user querying, or quarantine of the photograph file.
   b. Low likelihood of any confidential content. User will be queried or warned that there may be some confidential content in the photo, while handling of the file is temporarily delayed or prevented until the user responds that it is OK to handle. In some embodiments, there may be a time out value set by the user (minutes, hours, days), after which normal handling will be re-enabled if no user input has been received.

c. High likelihood of some confidential content. User will be queried or warned that there probably is some confidential content in the photo, while handling of the file is temporarily delayed or prevented until the user responds that it is OK to handle. In some embodiments, there may be a time out value set by the user (minutes, hours, days), after which normal handling will be prevented and the digital photograph file will be quarantined if no user input has been received. A user authentication password may optionally be required in order to designate such a tagged digital photograph as non-confidential, thereby creating some traceability as to who authorized such a photograph to be disseminated.

d. Very high likelihood of some confidential content. User will be queried or warned that there probably is some confidential content in the photo, while handling of the file is indefinitely delayed or prevented until the user responds that it is OK to handle. Optionally, digital photographs tagged in this manner may be securely quarantined and may require authentication and authorization by a person other than the owner or user of the device to re-enable dissemination, such as a login and permission by a corporate administrator or facility security officer.

Each of above factors may be combined to assess final score and likelihood that contents of the digital photograph are confidential in nature by some predetermined threshold.

Example User Interface

Figure 3:
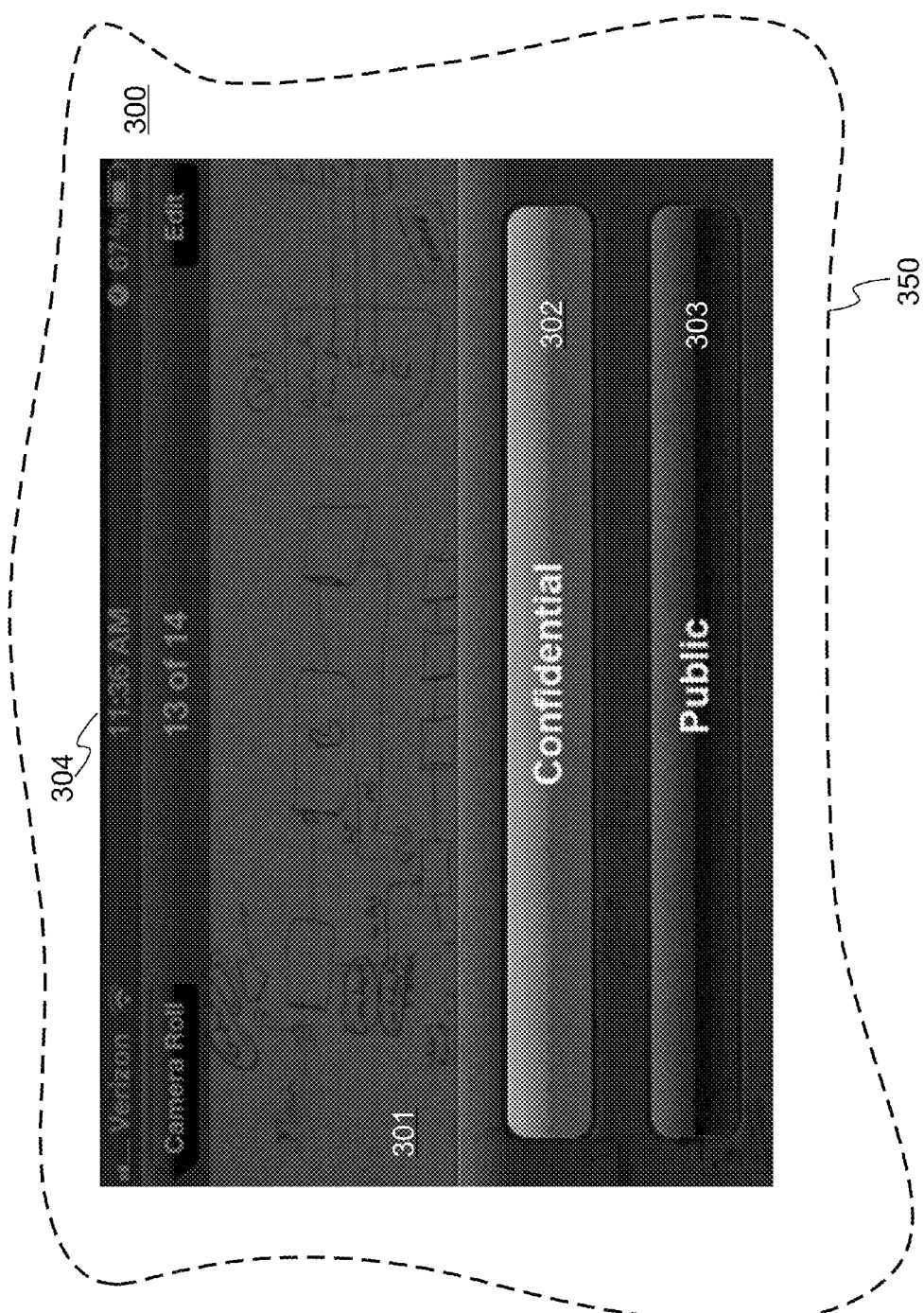
FIG. 3 depicts a user interface on a mobile photograph capturing device to alert and query the user regarding possible confidential or sensitive content within a photograph which is set for automatic dissemination.

If the confidentiality likelihood score resulting from a process according to the present invention is a within a threshold to express uncertainty of its confidential nature, the system may prompt (300) on a portion (350) of a user interface the user to flag the image as "confidential" (302) or "public" (303), as shown in FIG. 3. If flagged by the user to be confidential in nature, photograph file may be "locked down" (e.g. quarantined), restricted from distribution including to cloud-based services, copied or pasted within the operating system, transferred via connection to an unauthorized computer, transferred to a removable memory device (SIM card, USB flash drive, etc.), or even deleted after a predetermined amount of time. In this image, one of the criteria (time of photo capture) is also shown (304), which may be determinative of whether it is likely a work-related photo or a personal photo.

Second Logical Process Embodiment

Figure 2:
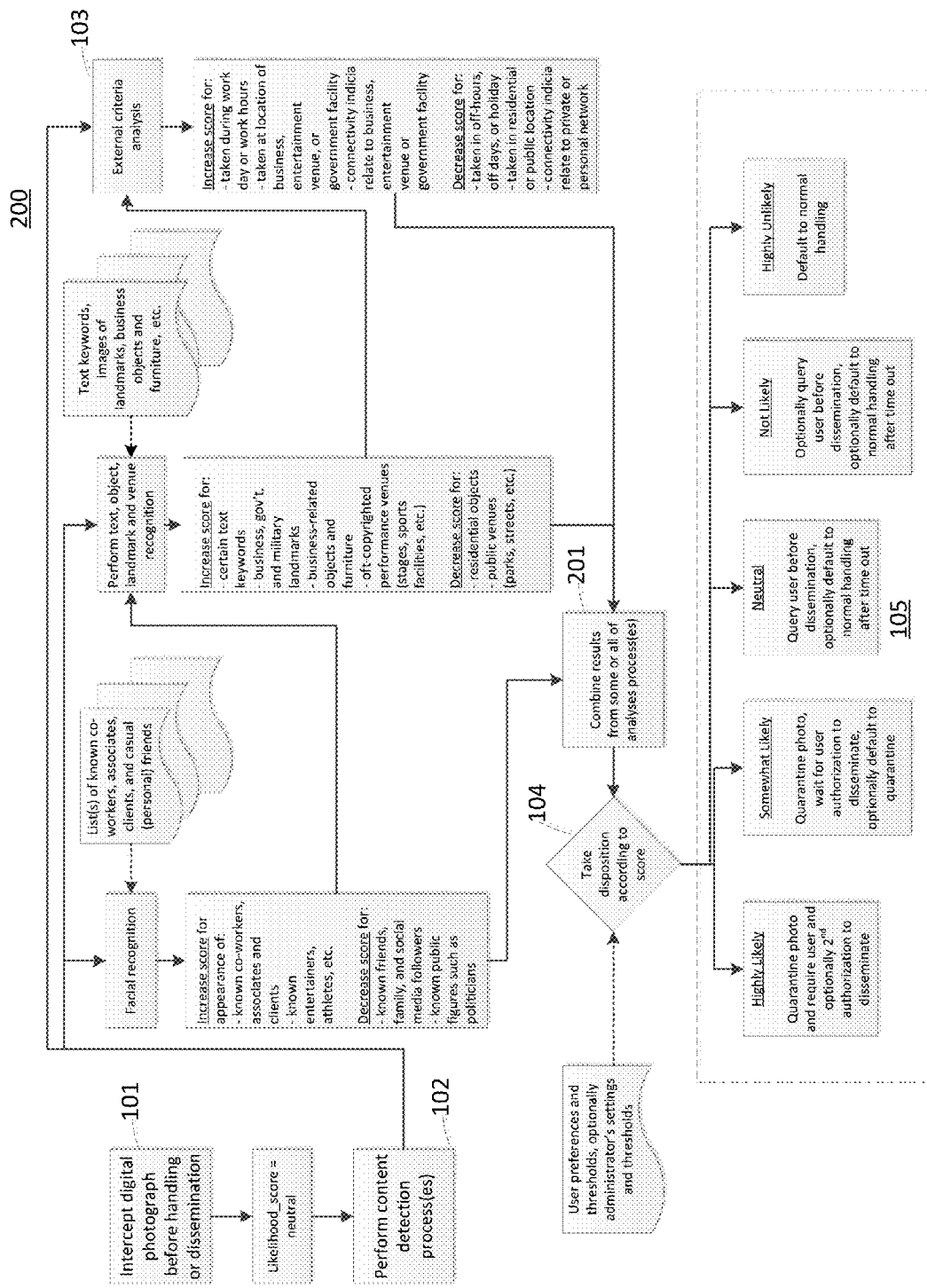
FIG. 2 illustrates a second example logical process according to the present invention.

Turning to FIG. 2, a second logical process embodiment (200) is shown and which is also suitable for realization in computer program instructions stored in a computer-readable, tangible storage memory device for causing a process to perform certain operations. This logical process (200) is similar to that of FIG. 1, however, the various analyses processes are performed in parallel or simultaneously to each other, and then their various results are combined (201), such as by straight averaging them, averaging them in a weighted fashion, or adding them to each other. Thresholds for declaring the likelihood of confidential content must be adjusted according to the combining method, to reflect the possible range of scores and outputs.

EXAMPLE USER EXPERIENCES

First Example

After collaborating with co-workers on a highly confidential project at work, a user takes a picture of the whiteboard in the conference room where they are meeting (see FIG. 3, for example). Based on the image contents being recognized as a business-related furniture object (a whiteboard with markings), the geo-location for where the picture was captured (on a corporate campus facility), and the time and day when the image was captured (11:36 am on a work day), the system determines that this picture is likely confidential because each of these factors causes the likelihood score to be increased from neutral. As a result, the image is intercepted by the invention and is not automatically distributed to the user's online photo sharing stream service, social network page or personal photo album.

Second Example

A user takes a picture using his or her camera phone of family members on a holiday at their home. Based on the image contents (people), additionally recognizing some of the faces in the photo as being designated as family members according to a social network page for the user, further considering that the geolocation for the photo is a private residence, and in addition considering the time and day of the photo (3:00 PM on a weekend) is not likely a work day or time, the digital picture is flagged as having a very low likelihood of containing confidential or sensitive content (e.g. "public" or "shareable") because all of these factors cause the likelihood score to be decreased from neutral. As a result, the image is allowed to be handled normally (e.g. automatically distributed to the user's online photo album, photo streaming service, or social network page).

Third Example

A user takes a picture of co-workers at 5:00 on a Friday while at campus. Based on the photo contents (people in general, and optionally faces recognized as co-workers), geolocation (a corporate campus facility), and time of day (after normal work hours), the system cannot determine with a high degree of confidence if the image is confidential or not, as some factors suggest confidentiality (people and location increase the score) while other factors do not (time of day decreases the score). As a result, the phone prompts the user to manually flag the image as confidential. Based on the user's input, the image may or may not be restricted:

Broader Applications of the Invention

As the present day problem primarily exists around near-instantaneous sharing of photographs, the example embodiments provided in this disclosure have centered on such operations of mobile devices. However, as other forms of digital assets are shared and "streamed" in near-real-time, the present inventors anticipate that other file types such as documents, movies, audio recordings, presentations, e-books, etc., may also pose the same risk of inadvertently sharing confidential, sensitive or copyrighted material. Therefore, those skilled in the art will recognize that the present invention, and embodiments representative thereof, will include such variations for other types and formats of shareable digital assets, files and application programs.

Embodiment Structures

The present inventors envision a variety of structural and cooperative functional embodiments for embodiments of the invention, such as the foregoing exemplary logical processes. A system may be implemented locally on mobile photograph capturing device (e.g. camera phone, tablet computer, network connected camera, etc.) as enhanced security mechanisms and features offered by the manufacturer of the device or the operating system provider within the device.

In another embodiment, the logical processes may be incorporated into an application ("app") which is downloadable onto such a mobile device, and which preferably roots itself into the operating system in a manner which prevents user disabling of it and disabling of it by other programs. Such rooting into an operating system is commonly seen in anti-virus and personal firewall program products, so addition of a logical process according to the present invention into a mobile security product (e.g. Lookout™, McAfee™, Norton™, etc.) is one available realization option.

In yet another embodiment approach, a system according to the present invention may be implemented external to the photograph capturing device using enhanced integration, communication and control of the capturing device by facilities' routers and servers, or as a logical extension to a connected device which is paired with the capturing device. For example, many higher-end cameras which are intended for serious amateurs and professional photographers do not connect to a broader network by themselves. Rather, they link to a secondary device using a cable (USB, FireWire™, etc.) or short-range wireless connection (e.g. BlueTooth™, WiFi, InfraRed Data Arrangement (IrDA), etc.), where the secondary device accesses the picture files in the capturing device. The secondary device can then often upload or otherwise disseminate these digital photos, as previously described. So, an embodiment which resides in the secondary device and operates according to the present invention may also prevent automatic dissemination of digital pictures captured by these non-networked capturing devices.

Computer Program Product

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the Suitable Computing Platform The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 4:
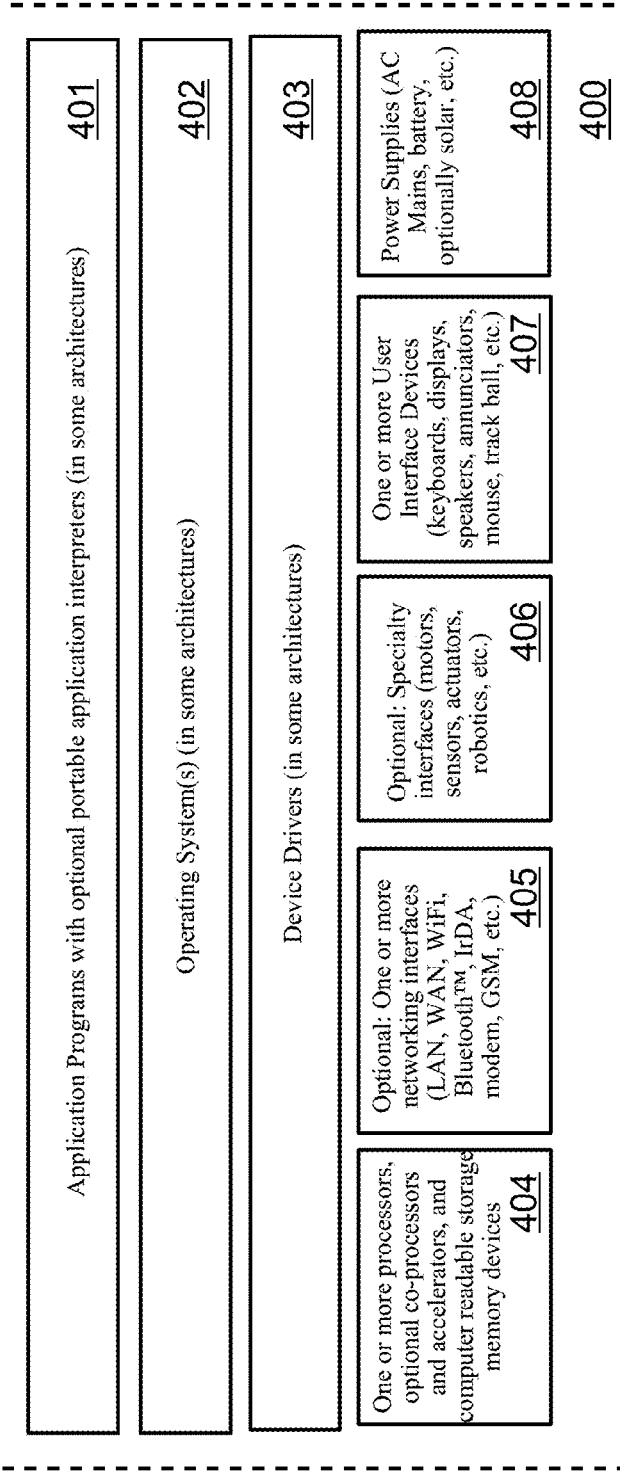
FIG. 4 illustrates a generalized computing platform suitable for combination with program instructions to perform a logical process such as shown in FIG. 3 to yield a computer system embodiment according to the present invention.

The present invention may be realized for many different processors used in many different computing platforms. FIG. 4 illustrates a generalized computing platform (400), such as common and well-known computing platforms such as "Personal Computers", web servers such as an IBM iSeries™ server, and portable devices such as personal digital assistants and smart phones, running a popular operating systems (402) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (401) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (404) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (405) may be provided, as well as specialty interfaces for specific applications. If the computing platform is intended to interact with human users, it is provided with one or more user interface devices (407), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. An automated method for preventing automatic distribution of a digital photograph that likely contains confidential information to a remote destination location comprising:
   analyzing by a processor a digital photograph using one or more detection processes which screen for potentially confidential information based on one or more criteria;
   adjusting by a processor a likelihood score responsive to detection of one or more criteria associated with potentially confidential information;
   responsive to one or more likelihood score thresholds, declaring by a processor the digital photograph as likely containing confidential information; and
   preventing by a processor automatic distribution of the digital photograph.

2. The method as set forth in claim 1 wherein the adjusting comprises:
increasing a likelihood score responsive to detection of criteria associated with potentially confidential information; and
decreasing the likelihood score responsive to detection of criteria associated with non-confidential information.

3. The method as set forth in claim 2 wherein the decreasing of the score is responsive to one or more detection processes results selected from the group consisting of recognition of faces associated with a user's non-work social group, detection of a non-business-related object, detection of an extrinsic criteria related to a non-business or non-work condition, and finding a geo-location tag associated with the data item indicating a non-business location.

4. The method as set forth in claim 1 wherein the one or more detection processes comprises a facial recognition process, and wherein recognition of faces associated with confidential information in the data item causes increasing of the score.

5. The method as set forth in claim 4 wherein the associated faces are associated with one or more groups selected from the group consisting of co-workers, clients, sports figures, and entertainment celebrities.

6. The method as set forth in claim 1 wherein the one or more detection processes comprises a business-related objects recognition process, and wherein recognition of business-related objects in the data item causes increasing of the score.

7. The method as set forth in claim 6 wherein the business-related object comprises one or more objects selected from the group consisting of a white board, a drawing board, a computer screen, and projected image, a conference room, conference room furniture, work space furnishings, a training room, training room furnishings, a government building, and a military building.

8. The method as set forth in claim 1 wherein the one or more detection processes comprises an extrinsic criteria analysis process, and wherein detection of extrinsic criteria related to a business or work condition causes increasing of the score.

9. The method as set forth in claim 8 wherein the business or work condition comprises one or more conditions selected from the group consisting of a time of day associated with a work day, a day of the week associated with a work week, a geo-location tag associated with the data item indicating a location of a business, a geo-location tag associated with the data item indicating a location of a government facility, a geo-location tag associated with the data item indicating a location of a military facility.

10. The method as set forth in claim 1 further comprising, responsive to a threshold of the score being indeterminate, querying a user via a user interface for a declaration of confidentiality of the digital photograph.

11. The method as set forth in claim 10 wherein the preventing further comprises a pre-defined action which is taken by default upon expiration of a period of waiting for a user response.

12. The method as set forth in claim 11 wherein the pre-defined action comprises one or more actions selected from the group consisting of quarantining the digital photograph, deleting the digital photograph, and allowing the digital photograph to be distributed.

13. The method as set forth in claim 1 wherein the preventing comprises preventing distribution to one or more destinations selected from the group consisting of a digital photograph streaming service, an online photograph album account, a social media account, a social media page, and an online backup service.

14. A computer program product for preventing automatic distribution of a digital photograph that likely contains confidential information to a remote destination location comprising:
a non-transitory computer readable, tangible storage memory device; and
one or more program instructions embodied by the non-transitory computer readable, tangible storage memory device for causing a processor to perform operations comprising:
analyzing a digital photograph using one or more detection processes which screen for potentially confidential information based on one or more criteria;
adjusting a likelihood score responsive to detection of one or more criteria associated with potentially confidential information;
responsive to one or more likelihood score thresholds, declaring the digital photograph as likely containing confidential information; and
preventing automatic distribution of the digital photograph.

15. The computer program product as set forth in claim 14 wherein the adjusting comprises:
increasing a likelihood score responsive to detection of criteria associated with likely confidential information; and
decreasing the likelihood score responsive to detection of criteria associated with likely non-confidential information; and
the one or more detection processes comprises one or more processes selected from the group consisting of a facial recognition process, a business-related objects recognition process, and an extrinsic criteria analysis process.

16. The computer program product as set forth in claim 14 further comprising, responsive to a threshold of the score being indeterminate, querying a user via a user interface for a declaration of confidentiality of the digital photograph.

17. A system for preventing automatic distribution of a digital photograph that likely contains confidential information to a remote destination location comprising:
a processor for performing computational and logical operations;
a non-transitory computer readable, tangible storage memory device; and
one or more program instructions embodied by the memory device for causing the processor to perform operations comprising:
analyzing a digital photograph using one or more detection processes which screen for potentially confidential information based on one or more criteria;
adjusting a likelihood score responsive to detection of one or more criteria associated with potentially confidential information;
responsive to one or more likelihood score thresholds, declaring the digital photograph as likely containing confidential information; and
preventing automatic distribution of the digital photograph.

18. The system as set forth in claim 17 wherein the adjusting comprises:
increasing a likelihood score responsive to detection of criteria associated with likely confidential information; and decreasing the likelihood score responsive to detection of criteria associated with likely non-confidential information; and the one or more detection processes comprises one or more processes selected from the group consisting of a facial recognition process, a business-related objects recognition process, and an extrinsic criteria analysis process.

19. The system as set forth in claim 17 wherein the program code furthers comprises program instructions to, responsive to a threshold of the score being indeterminate, query a user via a user interface for a declaration of confidentiality of the digital photograph.

\* \* \* \* \*